(12) United States Patent
Liu et al.

(10) Patent No.: US 12,472,445 B2
(45) Date of Patent: Nov. 18, 2025

(54) SPECIAL SOLAR ENERGY WATER JACKET HEATING FURNACE IN VACUUM MODE FOR OIL FIELD AND METHOD OF HEATING CRUDE OIL

(71) Applicant: GUANGDONG UNIVERSITY OF TECHNOLOGY, Guangzhou (CN)

(72) Inventors: Xiaozhou Liu, Guangzhou (CN); Zebin Fu, Guangzhou (CN); Zudong Xie, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 321 days.

(21) Appl. No.: 18/063,624

(22) Filed: Dec. 8, 2022

(65) Prior Publication Data
US 2023/0398465 A1    Dec. 14, 2023

Related U.S. Application Data

(63) Continuation of application No. PCT/CN2022/107592, filed on Jul. 25, 2022.

(30) Foreign Application Priority Data

Jun. 9, 2022    (CN) .......................... 202210648609.4

(51) Int. Cl.
| | | |
|---|---|---|
| *B01D 1/00* | (2006.01) | |
| *C10G 33/02* | (2006.01) | |
| *F22B 1/00* | (2006.01) | |

(52) U.S. Cl.
CPC ......... *B01D 1/0035* (2013.01); *B01D 1/0041* (2013.01); *B01D 1/0058* (2013.01); *C10G 33/02* (2013.01); *F22B 1/006* (2013.01); *C10G 2300/201* (2013.01)

(58) Field of Classification Search
CPC .. B01D 1/0035; B01D 1/0041; B01D 1/0058; C10G 33/02; C10G 2300/201; F22B 1/006
USPC .......................................................... 126/615
See application file for complete search history.

(56) References Cited

U.S. PATENT DOCUMENTS

| | | | | |
|---|---|---|---|---|
| 3,565,791 A | * | 2/1971 | Maizus et al. ... | C10M 175/0025 208/356 |
| 4,953,694 A | * | 9/1990 | Hayashi .................. | B01D 1/30 96/219 |

FOREIGN PATENT DOCUMENTS

| | | |
|---|---|---|
| CN | 205783813 U | 12/2016 |
| CN | 210688749 U | 6/2020 |

* cited by examiner

*Primary Examiner* — Avinash A Savani

(57) ABSTRACT

A special solar energy water jacket heating furnace in vacuum mode for an oil field comprises a vacuum heating system and a water jacket furnace heating system; the vacuum heating system comprises a steam generator, a vacuum heater and an ejector; the water jacket furnace heating system comprises a water jacket furnace, a burner, a flue gas chamber, a U-shaped pipe and a chimney, the flue gas chamber and the U-shaped pipe are arranged inside the water jacket furnace, and an inlet and an outlet of the flue gas chamber are respectively connected with the burner and the chimney through flue gas pipes; and the vacuum heater is provided with a crude oil inlet and a crude oil outlet, the steam generator is provided with a first outlet and the first outlet is connected with the ejector. A method for heating crude oil is further disclosed.

8 Claims, 2 Drawing Sheets

SPECIAL SOLAR ENERGY WATER JACKET HEATING FURNACE IN VACUUM MODE FOR OIL FIELD AND METHOD OF HEATING CRUDE OIL

CROSS-REFERENCE TO RELATED APPLICATIONS

This application is a continuation of International Patent Application No. PCT/CN2022/107592 with a filing date of Jul. 25, 2022, designating the United States, now pending, and further claims priority to Chinese Patent Application No. 202210648609.4 with a filing date of Jun. 9, 2022. The content of the aforementioned applications, including any intervening amendments thereto, are incorporated herein by reference.

TECHNICAL FIELD

The present invention relates to the field of oil well production technologies, and particularly to a special solar energy water jacket heating furnace in vacuum mode for an oil field and a method of heating crude oil.

BACKGROUND

At present, natural gas is used as fuel in most water jacket heating furnaces for an oil field, and the natural gas is widely applied due to a high heat value and good environmental protection. However, in recent years, the natural gas has become more and more expensive in price, resulting in high operating costs of the water jacket heating furnaces.

In addition, at present, traditional water jacket furnaces have a simple structure, and the structure of the traditional water jacket furnaces is shown in FIG. 1 of the specification. According to the structure of the traditional water jacket furnaces, a high-temperature flame is formed by burning natural gas through a burner, and heat is released to hot water in the water jacket furnace through a flue gas pipe and a flue gas chamber to heat the hot water to 95° C. Meanwhile, cold oil with the water content of 90% and the temperature of 20° C. passes through a U-shaped pipe to be heated to 80° C. by the 95° C. hot water outside the U-shaped pipe, and then is discharged out of the water jacket heating furnace. The hot oil still has the water content of 90%, without any concentration. It is also necessary to add a lot of heat in a subsequent process to evaporate water and concentrate to form crude oil. Due to small areas of the flue gas pipe and the flue gas chamber, the heat efficiency of the traditional water jacket heating furnaces is very low at present and its flue gas exhaust temperature reaches more than 550° C. Therefore, there is a problem of huge fuel consumption, which needs to be solved urgently.

SUMMARY

In order to solve the problems of high energy consumption and no concentration of a water jacket heating furnace mentioned in the background above, the solution provides a special solar energy water jacket heating furnace in vacuum mode for an oil field, which can effectively improve a heat efficiency of a crude oil heating furnace and a comprehensive utilization efficiency of energy of a whole system.

A technical solution used in the present invention to solve the technical problems is as follows: a special solar energy water jacket heating furnace in vacuum mode for an oil field comprises a vacuum heating system and a water jacket furnace heating system, wherein the vacuum heating system comprises a steam generator, a vacuum heater and an ejector, and the vacuum heater and the ejector are connected with each other; the water jacket furnace heating system comprises a water jacket heating furnace, a burner, a flue gas chamber, a U-shaped pipe and a chimney, the flue gas chamber and the U-shaped pipe are arranged inside the water jacket furnace, and an inlet and an outlet of the flue gas chamber are respectively connected with the burner and the chimney; and the vacuum heater is provided with a crude oil inlet and a crude oil outlet, the crude oil outlet is connected with an inlet of the U-shaped pipe, the steam generator is connected with the chimney and absorbs flue gas heat exhausted from the chimney, the steam generator is provided with a first output port, and the first output port is connected with the ejector through a pipeline. Steam generated by the steam generator is input into the ejector through the first outlet, and the ejector generates a suction effect to continuously suck out the steam in the vacuum heater, thus forming a vacuum state in the vacuum heater, and since the vacuum heater is in the vacuum state, a boiling point of a liquid in the vacuum heater will be lowered, so that water contained in the crude oil in the vacuum heater may be evaporated into steam at a lower temperature, and the steam is exhausted through the suction effect of the ejector.

Further, the steam generator is further provided with an afterburning burner to further provide energy for the vacuum system.

Further, the vacuum heating system further comprises a heat exchanger and a heating water jacket, the heat exchanger is provided with a gas intake pipe, a gas exhaust pipe, a water intake pipe and a water discharge pipe, the vacuum heater is arranged in the heating water jacket for heating, the steam generator is provided with a second outlet, and the second outlet is connected with the gas intake pipe through a pipeline. The gas exhaust pipe is connected with the chimney, the water discharge pipe is connected to a water inlet of the heating water jacket through a pipeline, and the heat exchanger heats the crude oil in the vacuum heater by making the hot water generated by flue gas heat adsorbed by the steam generator enter the heating water jacket. A water outlet of the heating water jacket is connected with the water intake pipe through a pipeline to realize water circulation, environmental protection and energy saving.

Further, the heating water jacket is further provided with a water supplement port.

Further, the vacuum heating system further comprises an induced draft fan, the induced draft fan is installed between the second outlet and the gas intake pipe, and high-temperature exhausted flue gas is conveyed into an evaporator to recycle waste heat through an action of the induced draft fan.

Further, a three-way valve is installed on the water discharge pipe, a first outlet of the three-way valve is connected with the water inlet of the heating water jacket, and a second outlet of the three-way valve is connected with the steam generator, so that water is conveniently supplied to the steam generator, and a whole system is more environmentally friendly and energy-saving Further, a gas exhaust valve is installed on the chimney, so that flue gas is conveniently controlled to be exhausted.

Further, the special solar energy water jacket heating furnace in vacuum mode for the oil field further comprises a solar heating system, wherein the solar heating system comprises a solar energy blackbody boiler and a heating pipe, the heating pipe is arranged in the solar blackbody boiler, and the heating pipe is connected with an outlet of the U-shaped pipe, so that solar energy is used to heat the crude oil again, without consuming other energy sources, thus realizing energy saving and emission reduction of the system.

Further, the solar heating system further comprises a solar reflector, the solar blackbody boiler is provided with a small hole, the solar reflector is aligned with the small hole, and the heating pipe is provided with a solar heat absorbing coating. The solar reflector reflects sunlight into the solar blackbody boiler from the small hole, the sunlight is diffusely reflected in the solar blackbody boiler for many times, and all energy of the sunlight is absorbed by the heating pipe mounted in the solar blackbody boiler, so that the crude oil is further heated, without consuming other energy sources, thus realizing energy saving and emission reduction of the system. The solar blackbody boiler is a cube, and an inner wall of the solar blackbody boiler is provided with a reflective coating.

Further, the solar heating system further comprises a solar light tracking device, and the solar light tracking device is connected with the solar reflector and drives the solar reflector to move, so that the solar reflector may better concentrate light.

The present invention further discloses a method for heating crude oil, wherein the special solar energy water jacket heating furnace in vacuum mode for the oil field above is used for executing the following steps of:

inputting crude oil with a water content of 90% and a temperature of 20° C. into the vacuum heating system for heating first by the vacuum heater, absorbing the heat of about 550° C. flue gas exhausted from the chimney by the steam generator to generate steam with 1 MP pressure and enter the ejector, generating a suction effect through the ejector to continuously suck out the steam in the vacuum heater and enter a sewage pool, so that a vacuum state is formed in the vacuum heater, and a boiling point of a liquid in the vacuum heater is lowered; absorbing heat of the steam generator and the heat of flue gas exhausted from the chimney by the heat exchanger, and generating 90° C. hot water to enter the heating water jacket to heat the crude oil in the vacuum heater, so that water in the crude oil is evaporated into steam and enter the sewage pool by the ejector, cooling the 90° C. hot water to 75° C. after heat release in the heating water jacket and then making the cooled water flow back to the heat exchanger, and heating and concentrating the crude oil with the water content of 90% and the temperature of 20° C. in the vacuum heater into crude oil with a water content of 60% and a temperature of 70° C.; and then, inputting the crude oil with the water content of 60% and the temperature of 70° C. into the water jacket furnace heating system for further heating, making the crude oil with the water content of 60% and the temperature of 70° C. pass through the U-shaped pipe, heating the crude oil to 85° C. in the water jacket furnace and then making the heated crude oil flow out of the water jacket furnace to enter the solar heating system for further heating, and making the crude oil with the water content of 60% and the temperature of 85° C. enter the solar blackbody boiler to be further heated to 95° C. by solar energy, without consuming natural gas, thus improving a comprehensive utilization efficiency of energy of the whole system.

The present invention has the beneficial effects as follows.

1. A vacuum method is used in the vacuum heating system of the present invention to remove water while heating the crude oil, without consuming natural gas, thus greatly reducing energy consumption.

2. A blackbody solar heating furnace is used in the solar heating system of the present invention to further heat the crude oil from 85° C. to 95° C. by solar energy, without consuming other energy sources, thus realizing energy saving and emission reduction of the system.

3. A multi-stage waste heat recycling mode is used in the present invention, steam and hot water are generated by using waste heat of flue gas of the water jacket furnace, and the crude oil is heated by the solar blackbody boiler at the same time, thus having a high energy utilization rate, energy saving and environmental protection.

4. The ejector in the present invention forms the vacuum state (by using a suction and injection principle) by using the high-pressure steam generated by the waste heat, without consuming natural gas, thus having low energy consumption.

5. In the present invention, the high-temperature hot water generated by the waste heat of the flue gas heat exhausted from the chimney provides a heat source for the vacuum heater, without consuming natural gas, thus having low energy consumption.

DETAILED DESCRIPTION

Figure 1:
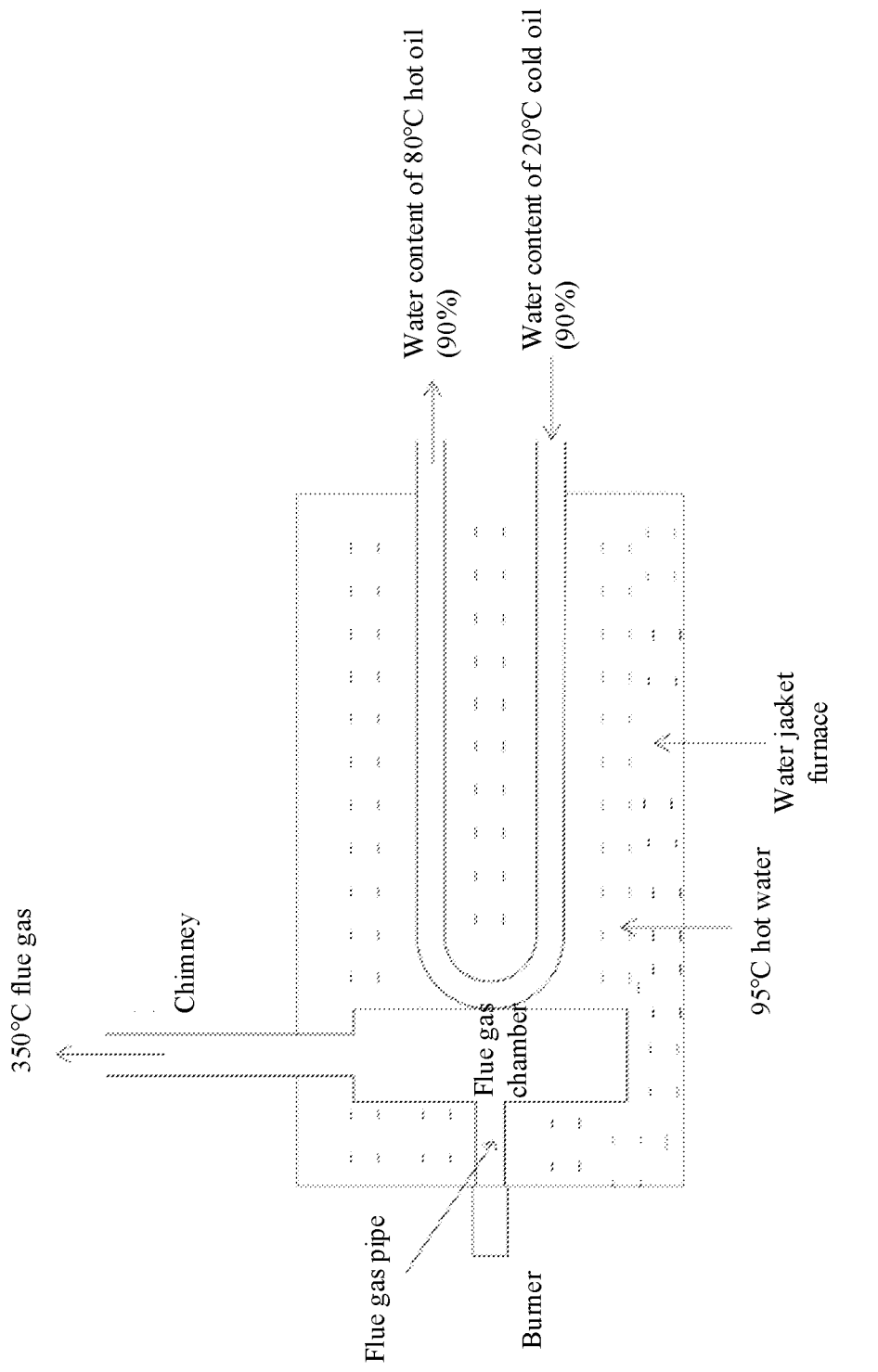
FIG. 1 is a functional block diagram of a structure of a traditional water jacket furnace.

The present invention is further described hereinafter with reference to the drawings. It is worth noting that the specific embodiments are only representative specific embodiments of the present invention, wherein the specific methods, devices, conditions, materials, and the like illustrated are not intended to limit the present invention or the corresponding specific embodiments. Therefore, each device in the drawings is only used for expressing the relative position and is not drawn according to the actual proportion, which should be cleared first.

Figure 2:
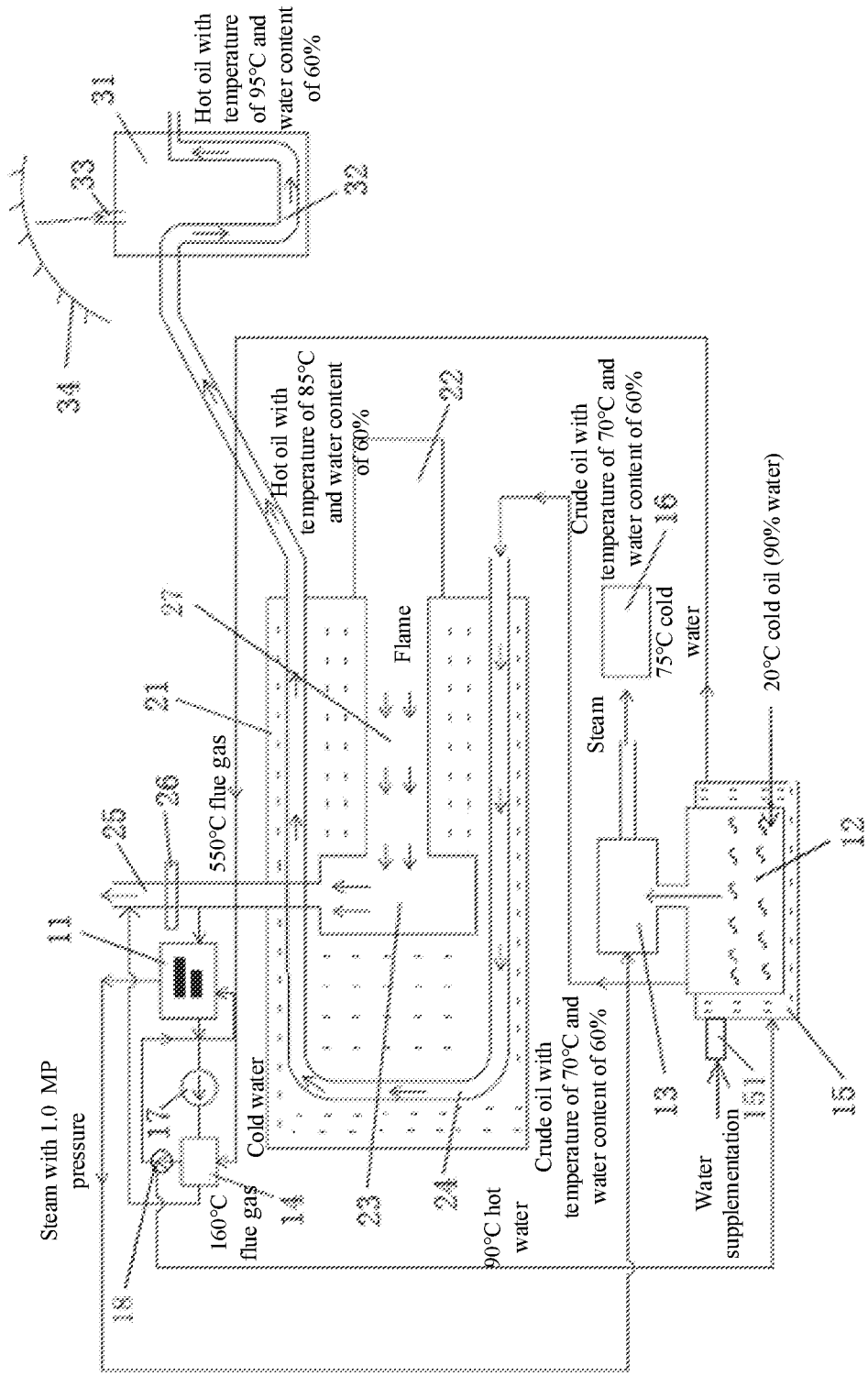
FIG. 2 is a functional block diagram of a structure of a special solar energy water jacket heating furnace in vacuum mode for an oil field according to the present invention.

As shown in FIG. 2, a special solar energy water jacket heating furnace in vacuum mode for an oil field comprises a vacuum heating system and a water jacket furnace heating system. The vacuum heating system comprises a steam generator 11, a vacuum heater 12, an ejector 13 and a sewage pool 16. An upper end of the vacuum heater 12 is open, the ejector 13 is installed above the vacuum heater 12, and the vacuum heater 12 and the ejector 13 are connected with each other. The water jacket furnace heating system comprises a water jacket furnace 21, a burner 22, a flue gas chamber 23, a flue gas pipe 27, an oil coil 24 and a chimney 25. The flue gas chamber 23 and the U-shaped pipe 24 are arranged inside the water jacket furnace 21, and an inlet and an outlet of the flue gas chamber 23 are respectively connected with the burner 22 and the chimney 25 through the flue gas pipe 27. The vacuum heater 12 is provided with a crude oil inlet and a crude oil outlet, the crude oil outlet is connected with an inlet of the U-shaped pipe 24, the steam generator 11 is connected with the chimney 25 and absorbs flue gas heat exhausted from the chimney 25, the steam generator 11 is provided with a first outlet, and the first outlet, is connected with the ejector 13 through a pipeline. Steam generated by the steam generator 11 is input into the ejector 13 through the first outlet, and the ejector 13 generates a suction effect to continuously suck out the steam in the vacuum heater 12 and exhaust the steam into the sewage pool 16, thus forming a vacuum state in the vacuum heater 12. Since the vacuum heater 12 is in the vacuum state, a boiling point of a liquid in the vacuum heater 12 will be lowered, so that water contained in the crude oil in the vacuum heater 12 may be evaporated into steam at a lower temperature, and the steam is exhausted through the suction effect of the ejector 13.

Further, the vacuum heating system further comprises a heat exchanger 14 and a heating water jacket 15. The heat exchanger 14 is provided with a gas intake pipe, a gas exhaust pipe, a water intake pipe and a water discharge pipe, the vacuum heater 12 is arranged in the heating water jacket for heating, the steam generator 11 is provided with a second outlet, and the second outlet is connected with the gas intake pipe through a pipeline. The gas exhaust pipe is connected with the chimney 25, the water discharge pipe is connected to a water inlet of the heating water jacket 15 through a pipeline, and the heat exchanger 14 heats the crude oil in the vacuum heater 12 by making the hot water generated by the heat of the steam generator enter the heating water jacket. A water outlet of the heating water jacket 15 is connected with the water intake pipe through a pipeline to realize water circulation, environmental protection and energy saving.

Further, the heating water jacket 15 is provided with a water supplement port 151.

Further, the steam generator 11 may be further provided with an afterburning burner (not shown in the drawing) to further provide energy for the vacuum system.

Further, the vacuum heating system further comprises an induced draft fan 17. The induced draft fan 17 is arranged between the second outlet and the gas intake pipe, and high-temperature exhausted flue gas is conveyed into an evaporator to recycle waste heat through an action of the induced draft fan 17.

Further, a three-way valve 18 is installed on the water discharge pipe, an inlet of the three-way valve 18 is connected with the water discharge pipe of the heat exchanger 14, a first outlet of the three-way valve 18 is connected with the water inlet of the heating water jacket 15, and a second outlet of the three-way valve 18 is connected with the steam generator 11, so that water is conveniently supplemented to the steam generator 11, and a whole system is more environmentally friendly and energy-saving Further, a gas exhaust valve 26 is installed on the chimney 25, so that flue gas is conveniently controlled to be exhausted.

Further, the special solar energy water jacket heating furnace in vacuum mode for the oil field further comprises a solar heating system. The solar heating system comprises a solar blackbody boiler 31 and a heating pipe 32. The heating pipe 32 is arranged in the solar blackbody boiler 31, and the heating pipe 32 is connected with an outlet of the U-shaped pipe 24, so that solar energy is used to heat the crude oil again, without consuming other energy sources, thus realizing energy saving and emission reduction of the system.

Further, the solar heating system further comprises a solar reflector 34. The solar blackbody boiler is provided with a small hole 33, the solar reflector 34 is aligned with the small hole 33, and the heating pipe 32 is provided with a solar heat absorbing coating. The solar reflector 34 reflects sunlight into the solar blackbody boiler 31 from the small hole, the sunlight is diffusely reflected in the solar blackbody boiler 31 for many times, and all energy of the sunlight is absorbed by the heating pipe 32 mounted in the solar blackbody boiler 31, so that the crude oil is further heated, without consuming other energy sources, thus realizing energy saving and emission reduction of the system. The solar blackbody boiler 31 is a cube, and an inner wall of the solar blackbody boiler 31 is provided with a reflective coating.

The present invention further discloses a method for heating crude oil, wherein the special solar energy water jacket heating furnace in vacuum mode for the oil field above is used for executing the following steps of:

inputting crude oil with a water content of 90% and a temperature of 20° C. into the vacuum heating system for heating first by the vacuum heater, absorbing the heat of about 550° C. flue gas exhausted from the chimney by the steam generator to generate steam with 1 MP pressure and enter the ejector, generating a suction effect through the ejector to continuously suck out the steam in the vacuum heater and enter a sewage pool, so that a vacuum state is formed in the vacuum heater, and a boiling point of a liquid in the vacuum heater is lowered; absorbing heat of the steam generator and the chimney by the heat exchanger, and generating 90° C. hot water to enter the heating water jacket to heat the crude oil in the vacuum heater, so that water in the crude oil is evaporated into steam and enter the sewage pool by the ejector, cooling the 90° C. hot water to 75° C. after heat release in the heating water jacket and then making the cooled water flow back to the heat exchanger, and heating and concentrating the crude oil with the water content of 90% and the temperature of 20° C. in the vacuum heater into crude oil with a water content of 60% and a temperature of 70° C.; and then, inputting the crude oil with the water content of 60% and the temperature of 70° C. into the water jacket furnace heating system for further heating, making the crude oil with the water content of 60% and the temperature of 70° C. pass through the U-shaped pipe, heating the crude oil to 85° C. in the water jacket furnace and then making the heated crude oil flow out of the water jacket furnace to enter the solar heating system for further heating, and making the crude oil with the water content of 60% and the temperature of 85° C. enter the solar blackbody boiler to be further heated to 95° C. by solar energy, without consuming natural gas, thus improving a comprehensive utilization efficiency of energy of the whole system.

The present invention has the following features.

1. A multi-stage waste heat recycling mode is used in the present invention: g steam with 1.0 MP pressure and 90° C. hot water are generated by using waste heat of flue gas of the water jacket furnace, and the crude oil is heated by the solar blackbody boiler at the same time, thus having a high energy utilization rate, energy saving and environmental protection.

2. A vacuum method is used in the present invention to remove water while heating the crude oil: the vacuum state is formed in the vacuum heater by the suction effect of steam with 1.0 MP pressure, the crude oil is boiled and heated by using the 90° C. hot water, and a part of water is removed while heating, thus saving a lot of energy for a subsequent dehydration process.

3. A blackbody solar heating furnace is used in the present invention, an upper portion of a furnace body is provided with a plurality of small holes, the sunlight is reflected into the solar heating furnace from the small holes by the rotatable solar reflector, the sunlight is diffusely reflected in the square solar heating furnace for many times, all energy of the sunlight is absorbed by the heating pipes of the crude oil installed on front and rear wall surfaces and a bottom portion of the solar heating furnace, and the crude oil is further heated from 85° C. to 95° C. by solar energy, without consuming other energy sources, thus realizing energy saving and emission reduction of the system.

4. The ejector in the present invention forms the vacuum state (by using a suction and injection principle) by using the high-pressure steam generated by the waste heat, without consuming natural gas.

5. In the present invention, the high-temperature hot water generated by the waste heat provides a heat source for the vacuum heater, without consuming natural gas.

The above are only the preferred embodiments of the present invention, and are not intended to limit the implementation scope of the present invention, which means that all simple equivalent changes and modifications made according to the scope of the patent for application of the present invention and the contents of the description of the present invention should all belong to the scope of the patent of the present invention.

The invention claimed is:

1. A special solar energy water jacket heating furnace in vacuum mode for an oil field, comprising a vacuum heating system and a water jacket furnace heating system, wherein the vacuum heating system comprises a steam generator, a vacuum heater and an ejector, and the vacuum heater and the ejector are communicated with each other; the water jacket furnace heating system comprises a water jacket furnace, a burner, a flue gas chamber, a U-shaped pipe and a chimney, the flue gas chamber and the U-shaped pipe are arranged inside the water jacket furnace, and an inlet and an outlet of the flue chamber are respectively connected with the burner and the chimney; and the vacuum heater is provided with a crude oil inlet and a crude oil outlet, the crude oil outlet is connected with an inlet of the U-shaped pipe, the steam generator is connected with the chimney and absorbs flue gas heat exhausted from the chimney, the steam generator is provided with a first outlet, and the first outlet is connected with the ejector;

wherein the vacuum heating system further comprises a heat exchanger and a heating water jacket, the heat exchanger is provided with a gas intake pipe, a gas exhaust pipe, a water intake pipe and a water discharge pipe, the vacuum heater is arranged in the heating water jacket, the steam generator is provided with a second outlet, and the second outlet is connected with the gas intake pipe.

2. The special solar energy water jacket heating furnace in vacuum mode for the oil field according to claim 1, wherein a water outlet of the heating water jacket is connected with the water intake pipe.

3. The special solar energy water jacket heating furnace in vacuum mode for the oil field according to claim 1, wherein the vacuum heating system further comprises an induced draft fan, and the induced draft fan is arranged between the second outlet and the gas intake pipe.

4. The special solar energy water jacket heating furnace in vacuum mode for the oil field according to claim 1, wherein a three-way valve is installed on the water discharge pipe, a first outlet of the three-way valve is connected with a water inlet of the heating water jacket, and a second outlet of the three-way valve is connected with the steam generator.

5. The special solar energy water jacket heating furnace in vacuum mode for the oil field according to claim 1, wherein a gas exhaust valve is installed on the chimney.

6. The special solar energy water jacket heating furnace in vacuum mode for the oil field according to claim 1, further comprising a solar heating system, wherein the solar heating system comprises a solar blackbody boiler and a heating pipe, the heating pipe is installed in the solar blackbody boiler, and an inlet of the heating pipe is connected with an outlet of the U-shaped pipe.

7. The special solar energy water jacket heating furnace in vacuum mode for the oil field according to claim 6, wherein the solar heating system further comprises a solar reflector, the solar blackbody boiler is provided with a small hole, the solar reflector is aligned with the small hole, and the heating pipe is provided with a solar heat absorbing coating.

8. The special solar energy water jacket heating furnace in vacuum mode for the oil field according to claim 7, wherein the solar blackbody boiler is a cube, and an inner wall of the solar blackbody boiler is provided with a reflective coating.

* * * * *